(12) United States Patent
Oberzaucher et al.

(10) Patent No.: US 7,041,936 B2
(45) Date of Patent: May 9, 2006

(54) METHOD FOR CONNECTING SEVERAL WELDING DEVICES AND CORRESPONDING WELDING DEVICE

(75) Inventors: Friedrich Oberzaucher, Wels (AT); Michael Brunner, Seiersberg (AT)

(73) Assignee: Fronius International GmbH, Pettenbach (AT)

(*) Notice: Subject to any disclaimer, the term of this patent is extended or adjusted under 35 U.S.C. 154(b) by 175 days.

(21) Appl. No.: 10/416,956

(22) PCT Filed: Dec. 6, 2001

(86) PCT No.: PCT/AT01/00385

§ 371 (c)(1),
(2), (4) Date: May 15, 2003

(87) PCT Pub. No.: WO02/47861

PCT Pub. Date: Jun. 20, 2002

(65) Prior Publication Data

US 2004/0026391 A1    Feb. 12, 2004

(30) Foreign Application Priority Data

Dec. 15, 2000 (AT) .............................. A 2097/2000

(51) Int. Cl.
*B23K 9/10* (2006.01)

(52) U.S. Cl. .............................. 219/130.5; 219/130.21

(58) Field of Classification Search ............. 219/130.1, 219/130.21, 130.31, 130.32, 130.33, 137 PS, 219/130.5
See application file for complete search history.

(56) References Cited

U.S. PATENT DOCUMENTS 4,503,316 A    3/1985  Murase et al.
5,120,929 A    6/1992  Koga et al.
5,811,757 A *  9/1998  Higgins ................. 219/130.32
6,023,037 A    2/2000  Church et al.
6,291,798 B1 * 9/2001  Stava ..................... 219/130.32

FOREIGN PATENT DOCUMENTS

| DE | 2628385  | * 12/1977 |
| DE | 3200086  | 7/1983    |
| DE | 19930678 | 11/2000   |
| EP | 1086773  | * 3/2001  |
| JP | 08001350 | 1/1996    |

* cited by examiner

Primary Examiner—Clifford C. Shaw
(74) Attorney, Agent, or Firm—Collard & Roe, P.C.

(57) ABSTRACT

The invention relates to a method of linking several current sources, in particular several welding devices (1; 27; 28), plasma current sources or similar. Operating individually and independently of one another, a process control and/or regulating system (4; 31; 32) in every welding device (1; 27; 28) transmits desired values to a voltage-to-current controller of a power component (3; 29; 30). The power component (3; 29; 30) supplies a consumer connected to output jacks (38, 39; 40, 41; 42, 43) with power on the basis of the desired values. For the purposes of the invention, several welding devices (1, 27, 28) of the same and/or a different power rating or having the same and/or different machine specifications, are linked to one another on the secondary-side via the output jacks (38 to 43) to form a welding device (1, 27, 28) with a physically higher power output, whereby the interconnected welding devices (1, 27, 28) are digitally interconnected via a digital interface (44, 45, 46) which is known per se and/or a special digital connecting interface (47, 48, 49) for a data exchange. A process control and/or regulating system (4, 32, 33) of one welding device (1, 27, 28) assumes process control for all the other connected welding devices (1; 27; 28).

16 Claims, 3 Drawing Sheets

Fig.2

METHOD FOR CONNECTING SEVERAL WELDING DEVICES AND CORRESPONDING WELDING DEVICE

CROSS REFERENCE TO RELATED APPLICATIONS

Applicants claim priority under 35 U.S.C. §119 of AUSTRIAN Application No. A 2097/2000 filed on 15 Dec. 2000. Applicants also claim priority under 35 U.S.C. §365 of PCT/AT01/00385 filed on 6 Dec. 2001. The international application under PCT article 21(2) was not published in English.

The invention relates to a method of linking several welding devices, in particular several welding current sources or plasma current sources, and a corresponding welding apparatus.

The idea of configuring process control and/or regulating systems for welding devices, in particular welding current sources, with a data interface is known. Across this data interface, which may be a standardised serial interface for example, data can be exchanged with a primary data processing system, e.g. a robot controller. Software editing and programme updates can also be run across this standard interface of the process control and/or regulating system of the welding device, whereby either new programme data or updated software codes are stored in a memory of the process control and/or regulating system. It is also known that a process control and/or regulating system of this type can be used to control and regulate several power components connected to it. With the known systems, it is not possible to link several pieces of welding apparatus and charging current sources to form a single functional unit to enable several pieces of welding apparatus to be operated in a cohesive combination.

An electronic power setting system, used in particular as a source of welding energy, is known from patent specification DE 199 30 678 A1, whereby a current source and welding apparatus are set up on the basis of several modules. To this end, a single welding device is set up using at least two power components of the same type and a process control and/or regulating system. Each power component has a separate control circuit for this purpose, in particular a voltage-to-current controller, and has a mains power connection, a process output and at least one control input. The power components are connected in parallel or in series on the process side and on the control side are connected to an upstream power component or a primary process control and/or regulating system.

The disadvantage of this system is that welding apparatus and current sources of a modular arrangement of this type can not be connected to one another to form a physical welding apparatus or a current source with a high output without manual intervention, because every welding device or every current source has a separate process control and/or regulating system for regulating and/or controlling the process. These would have to be manually or electronically removed or deactivated where several such welding devices are connected to one another, in order to be able to activate other connected power components from primary process control and/or regulating system for a common process.

The underlying objective of the present invention is to propose welding devices and current sources, in particular welding current sources or plasma current sources, which can be operated as a functional unit, and to propose a method whereby several independent welding devices and current sources can be activated and controlled in combination as a single unit.

This objective is achieved by the invention with a method of linking and interconnecting several welding devices, in particular several welding current sources, plasma current sources or similar, in which, with every welding device operating individually, a process control system transmits desired values to a voltage-to-current controller of a power component and the power component supplies a consumer connected to output jacks with power (current/voltage) on the basis of the desired values, and the process control system is equipped for a data exchange across an interface with another component, such as another welding device, a robot controller, a PC or laptop, wherein several welding devices of the same or a different power rating or having the same or different output parameters, in particular machine specifications, are linked to one another on the secondary-side via the output jacks to form a welding device with a physically higher power output, the interconnected welding devices being digitally interconnected via a digital interface or a special digital connecting interface for a data exchange for control purposes, a process control system of one welding device assuming process control and all other process control systems of the welding devices being deactivated by an interrupter element and the welding devices with the deactivated process control systems receiving the desired values across the interface or the connecting interface from the process-controlling welding device, the interrupter element being operated on the basis of software in the process control system.

The advantage of this approach is that because of the specified connection system, every power component of the individual, linked welding devices and current sources can be used, thereby enabling the power potential of the overall unit to be increased as compared with a single unit. Another advantage primarily resides in the fact that the requisite capacity can be achieved with no additional connecting lines other than an interface cable, of the type known from the prior art, because when a welding device or current source is connected in this manner, the control and regulation function can be taken over, in particular by the process control system thereof. Since a single control and regulation function alone is advantageously able to assume control and monitoring of the power components and current sources, no inadmissible or undefined situations can occur, as is the case in particular when using several process control systems of several welding devices simultaneously without running a set of complicated validation mechanisms. Another advantage resides in the fact that, of the components of the welding apparatus to be controlled and regulated, only a single welding device is activated, which imparts a high degree of stability and operating safety to the entire unit. The control and process regulating system is therefore in a position to activate and regulate several power components, enabling use to be made of the output potential of the plurality of power components.

Another significant advantage is achieved due to the fact that the welding process can be centrally controlled and any intervention in the welding process can be operated from one welding device alone, and the other welding devices and current sources will be automatically adjusted and adapted to the new desired values. By preference, the additional process control and/or regulating systems of the other welding devices are connected so that they can be forcibly or automatically deactivated or disabled, so that carelessness on the part of the user can not incur any consequential damage or result in any adverse effects. Once the process control and/or regulating system is linked, amongst others, to the input and/or output device of the welding device and the other components of the welding apparatus are activated and controlled on the basis of the adjustable desired values duly entered by the user, only the operating elements or the input and/or output elements of a single current source will be active, ruling out any deviant settings at the individual pieces of welding apparatus from the outset. In this respect, it is of particular advantage to connect several pieces welding devices in parallel because this will enable differing voltage amplitudes to be avoided in welding apparatus connected in parallel. A major advantage is achieved due to the fact that several welding devices with relatively low output ratings can be combined to obtain a unit with a higher power output. This is of particular advantage in situations where it is not economical for a user to acquire higher-power and usually cost-intensive welding apparatus that is not used on a very frequent basis and, instead, several welding devices with a relatively lower power rating can be used and operated in combination to set up a welding device unit with a correspondingly higher power output.

In order to minimise output current ripple or improve electromagnetic compatibility, the individual power components are synchronised with one another at the same clock frequency via the interface or via the connecting interface, the individual power components being activated with a corresponding phase shift. This is of advantage because it enables co-ordinated and synchronised process control of the individual items of welding apparatus, thereby permitting different types of welding apparatus to be linked to one another.

Preferably, the active process control system does not detect the number of interconnected welding devices and power components but the sum of the achievable power, in particular the output voltage and/or the output current. The advantage of these features is that the desired values and the control signals can be configured for the achievable power, which provides a simple means of controlling the power output of the individual welding devices.

A selected mains load is permitted if the interconnected welding devices are set up in a star circuit, triangular circuit or connected in parallel to an alternating and three-phase voltage supply.

If the welding devices are electromagnetically, electrically, optically or inductively linked on the control side, the same electric control signal and the respective desired value is forwarded to all power components and devices connected upstream of the power components can be simultaneously disconnected so as to be at least rendered inactive.

The output jackets may be connected to one another in parallel or in series via lines or welding lines, depending on the required power output, at least two of the output jacks being connected to a positive and a negative potential, to the consumer, in particular the welding torch. Thus, if differently rated current sources or power components are used, the load can be divided, making allowance for the output limits of the corresponding power components.

The advantage of the features defined in claim 8 is that if differently rated current sources or power components are used, and the load can be divided, making allowance for the output limits of the corresponding power components.

If safety values or control functions needed for a welding process and a current supply process, such as over-temperature, input voltage, over-current, are monitored and operated by every welding device independently. This offers the highest possible degree of safety and functional capacity, and if a control system or a detection system fails, the other control and detection systems are able to assume at least some of the respective functions and initiate measures accordingly.

Full use can be made of the power capacity, in particular computing capacity, and the functions of the other welding devices if the data transmission between the individual welding devices is run in two directions via the interface or via the connecting interface.

Preferably, when the interfaces or the connecting interface are activated by the interrupter element, data communication between the process control system and an interface or the power component is disabled. This is of advantage because, by providing the additional connecting interface and in effect by providing a standardised interface, for the welding device or the current source linking other welding devices or current sources, at least the process control systems of these other current sources can be deactivated so that control of the unit incorporating fully functioning, independent welding devices or current sources is assumed by one process control system alone, thereby ruling out any irregular process controls or instabilities such as can occur when a process is regulated by several active controllers.

The objective is also achieved by the invention with a welding device, in particular a welding current source or plasma current source, consisting of at least one process control system and one power component, in which a voltage-to-current controller is integrated, comprising at least one digital connecting interface or a digital interface, via which this welding device can be linked for control purposes to at least one other welding device of a like configuration, an output jack of the power component of this welding device being connectable, on the secondary side, to output lacks of at least one other power component of another welding device with the same or a different power rating and having the same or different output parameters, in particular machine specifications, and a process control system of this welding device is activated in order to control the process of all the interconnected welding devices and all other process control systems of the other welding devices are deactivated, the welding device having an interrupter element, by means of which the process control system can be deactivated, the interrupter element being set up by means of software in the process control system.

One advantage achieved as a result of the features defined in the characterising part of this claim is that at least systems upstream of the process regulating system, such as the process control system or the input or output device or the operating elements, can be at least disconnected from the power component and rendered inactive so that upstream systems connected to the welding apparatus can no longer have any effective influence. Also, no electrical switching procedures have to be initiated in order to at least temporarily disable the function of redundant components or systems.

If the output jacks of the interconnected power components are connected to one another in parallel or in series, it enables several welding devices to be grouped as one physical welding device with a high power output.

Respective applicable desired values or control or regulating signals of the active process control system can be directly forwarded to the process regulating systems and the power components of welding devices connected downstream, so that they can independently initiate a process control separately, based on the respective desired values, if the interface or the connecting interface is linked to an interface of a welding device.

The welding device may have a detection system for activating the interface or the connecting interface, and the detection system may be provided in the form of an electromechanical switching mechanism or by a transponder system or by means of software in the process control system. This has the advantage, when changes occur at the interface or connecting interface due to the fact that several welding devices have been linked, a connection or interconnection procedure can be detected by individual welding devices via this interface or interconnecting interfaces, whereupon appropriate measures can be initiated or undertaken, enabling the overall unit comprising the individual welding devices to be automatically and correctly operated. Switching operations to the interface or the interconnecting interface of individual welding devices can therefore be evaluated as an indication of an intended interconnection of several welding devices, thereby dispensing with the need for additional manual setting or re-setting tasks by a user.

The invention will be explained in more detail below with reference to examples of embodiments illustrated in the appended drawings.

Of these.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
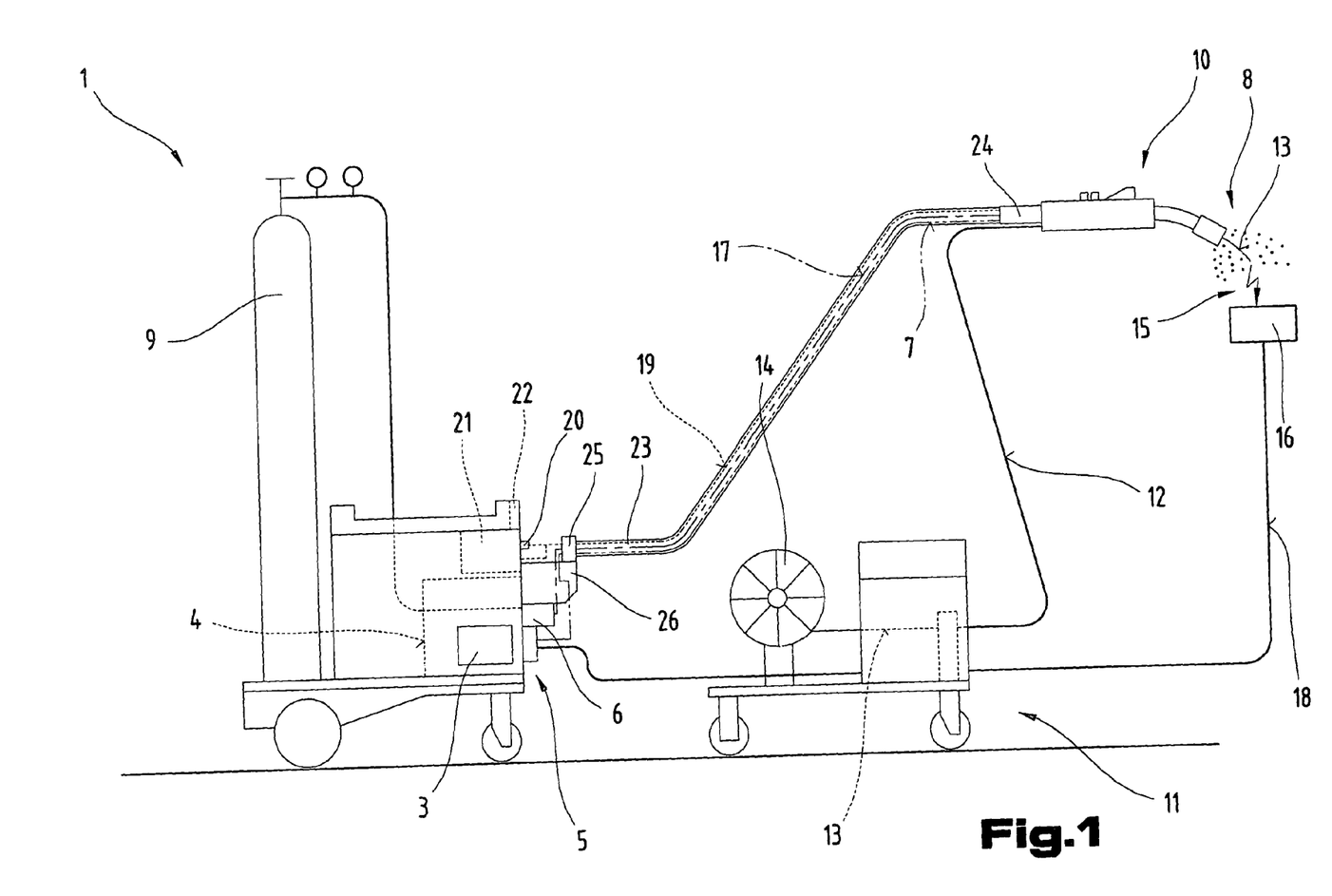
FIG. 1 is a simplified, schematic diagram showing a configuration for a welding apparatus incorporating a current source as proposed by the invention.

FIG. 1 illustrates a welding system and a welding device 1 for a whole range of welding processes, e.g. MIG-MAG welding and WIG or TIG welding or electrode welding processes. However, the solution proposed by the invention may also be used for current sources for charging devices, in particular for battery charging devices and for current sources used in plasma cutting and/or plasma welding technology.

The welding device 1 has a current source 2 with a power component 3, a process control and/or regulating system 4 and a switching element 5 co-operating with the power component 3 and process control and/or regulating system 4. The switching element 5 or the process control and/or regulating system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the process control and/or regulating system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding device 1, in particular to the current source 2, via another supply line 18 so that a current circuit can be established across the arc 15.

In order to cool the welding torch 10, the welding torch 10 can be connected via a cooling circuit 19, with an integrated flow indicator 20, to a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding device 1 also has an input and/or output device 22, by means of which a whole range of settings can be entered for welding parameters and operating modes of the welding device 1. The welding parameters entered at the input and/or output device 22 are then forwarded to the process control and/or regulating system 4, from where they are applied to the individual components of the welding system and the welding device 1.

In the embodiment illustrated as an example here, the welding torch 10 is also connected to the welding device 1 and the welding system by means of a hose pack 23. The individual lines from the welding device 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

Figure 2:
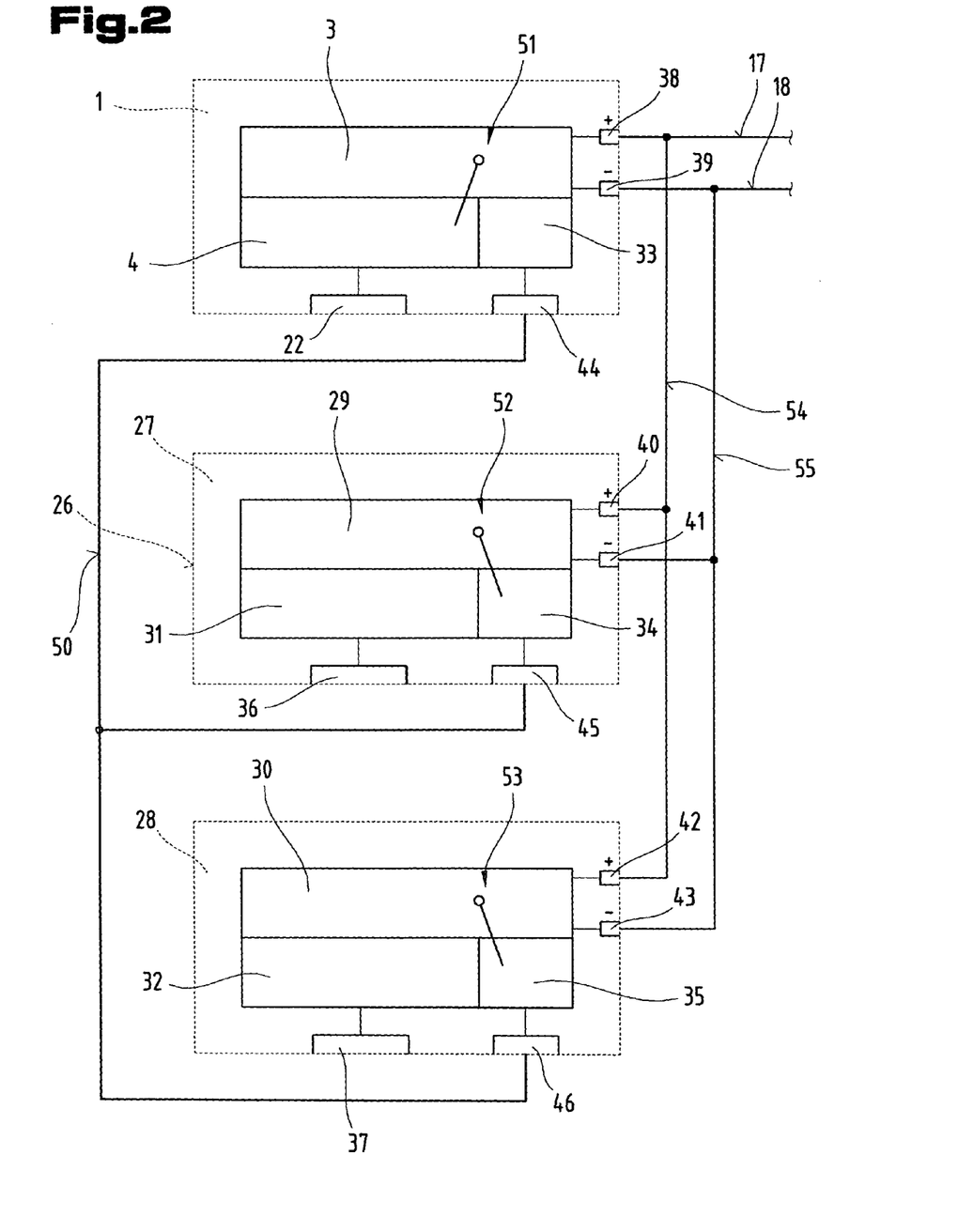
FIG. 2 illustrates several welding devices, which are linked across a standardised interface and the outputs of which are connected in parallel.
Figure 3:
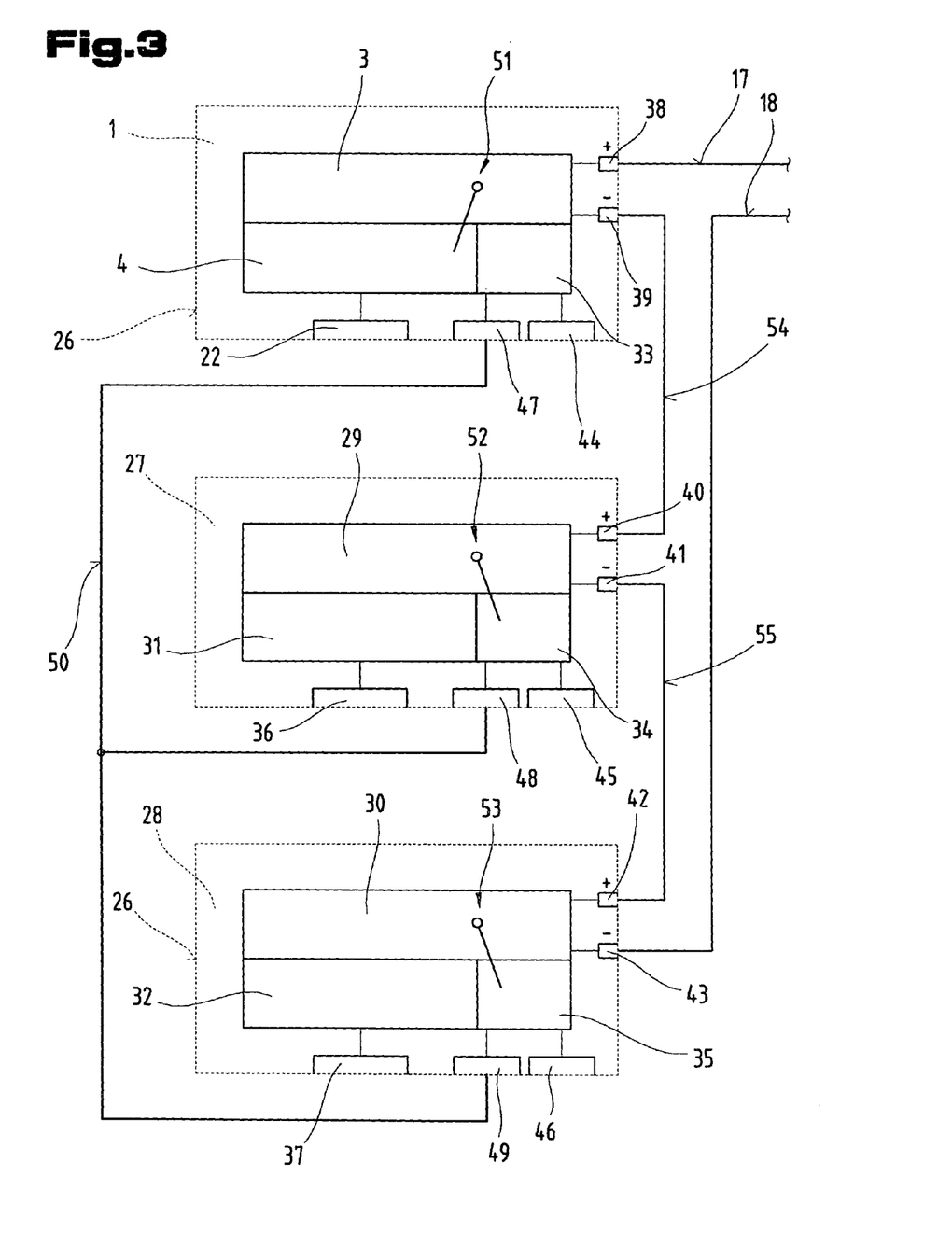
FIG. 3 illustrates several welding devices, which are linked across appropriate interconnecting interfaces, and outputs of which are connected in series.

FIGS. 2 and 3 are block diagrams illustrating several welding devices 1, 27, 28, although all the units and components needed to set p a welding device 1, 27, 28 have been left out of the diagrams. The welding devices 1, 27, 28 may be of the type described with reference to FIG. 1.

To make the diagram of the solution proposed by the invention clearer, the structure of the welding devices 1, 27, 28 is illustrated in the form of a highly simplified block diagram, showing only the essential individual components needed to set up the solution proposed by the invention. The welding devices 1, 27, 28 are made up of a power component 3, 29, 30, in which a digital voltage-to-current controller is integrated, a process control and/or regulating system 4, 31, 32, in particular a microprocessor controller, for controlling and/or regulating a process, in particular a welding process, and an interface 33, 34, 35, for running communications with the internal and/or external units and components. Naturally, it would also be possible for the individual units and components to communicate directly with one another.

Other internal and/or external units are connected to the individual components of the welding device 1, 27, 28 illustrated. For example, an input and/or output device 22, 36, 37 for entering settings and displaying the welding parameters is connected to the process control and/or regulating system 4, 31, 32. The power component 3, 29, 30, for example, is connected to output jacks 38 to 43 on the secondary side for the positive and negative potential, so that when a welding torch 10 is connected—FIG. 1—a process that has been set up, in particular a welding process, can be run accordingly via the supply lines 17, 18. In order to be able to operate a data transmission with an external unit or system, such as a robot controller, a SPC controller, a PC or a laptop, etc., for example, a standardised digital interface 44, 45, 46 is connected to the interface 33, 34, 35. Other units or structural elements or components, not illustrated, such as a wire feed device, a cooling circuit, etc., may naturally also be connected to the appropriate components or to special or standardised terminal devices, so that they can be activated and controlled accordingly.

In order to be able to run a welding process using the schematically illustrated welding devices 1, 27, 28 independently of one another, a user can set up a corresponding welding process and individual welding parameters or operating parameters from the input and/or device 22, 36, 37, so that the welding processes can then be computed by the process control and/or regulating systems 4, 31, 32, prompting the process control and/or regulating systems 4, 31, 32 to forward one or more control and/or regulating signal(s) to the other components of the welding device 1, 27, 28. In the embodiment illustrated as an example here, the process control for a welding process is run only by the components of the power component 3, 29, 30, i.e. the detected actual values of the welding process are sent back directly to the power component 3, 29, 30, for example, so that the process control and/or regulating system 4, 31, 32 is used only for running control, regulating and monitoring functions. As a result, the process control for the technical process to be run, in particular the welding process, is effected independently of the individual process control and/or regulating systems 4, 31, 32. In the embodiment illustrated as an example here, the individual actual values may be detected using systems known from the prior art, for example a current-measuring resistor or shunt—not illustrated—set up to detect the current value. Naturally, it would be possible for control and regulation of the other units and components to be run by the process control and/or regulating system 4, 31, 32.

By integrating the standardised digital interface 44, 45, 46, in particular a RS232 interface, any appropriate software changes and programme changes or operating data and welding parameters can be transmitted and received across this interface 44, 45, 46 in digital format, in other words using a digital data protocol. As a result, the welding devices 1, 27, 28 can be easily adapted to the latest welding programmes and when the welding devices 1, 27, 28 are connected to a welding robot, for example, corresponding process data such as welding startup, welding stop and such like can be transmitted.

Procedures and functions of the type outlined above are already known from the prior art and can be automatically run by each of the illustrated welding devices 1, 27, 28 independently of one another.

For the purposes of the invention, several welding devices 1, 27, 28 with the same and/or a different power rating or the same and/or different output parameters, in particular machine specifications, can be interconnected on the secondary side via the output jacks 38 to 43 in order to set up a welding device 1 or 27 or 28 with a higher physical power output, and in order to control or regulate the interconnected welding devices 1, 27, 28, the latter are digitally interconnected across a digital interface 44, 45, 46 of a type known per se and/or across a special digital connecting interface 47, 48, 49, as illustrated in FIG. 3, for a two-way data exchange, in which case one of the process control and/or regulating systems 4, 31, 32, in this particular case the process control and/or regulating system 4 of welding device 1, will assume process control whilst all the other process control and/or regulating systems 31, 32 of welding devices 27, 28 are deactivated and the welding devices 27, 28 with the deactivated process control and/or regulating systems 31, 32 will receive the desired values across the interface 44, 45, 46 and/or via the connecting interface 47, 48, 49 from the welding device 1 controlling the process.

To this end, on the control side, the welding devices 1, 27, 28 illustrated in FIG. 1 are interconnected via the digital interface 44, 45, 49 by means of at least one interface cable 50. This being the case, the interface 44, 45, 46 may be provided with a detection system, not illustrated. This detection system may be provided in the form of a switching system, a transponder system, etc., or by software means, and in the particular embodiment illustrated as an example here the detection system is operated by means of software. Its purpose is to detect what type of data transmission is to be run when a contact or a connection is established via the interface cable 50 to the interface 44, 45, 46, and whether a data exchange is to be operated with another welding device 1, 27, 28 or with another system, such as a robot controller for example. For this purpose, the detection system is connected directly to the process control and/or regulating system 4, 31, 32 and the interface 33, 34, 35 and, if operated on the basis of software, may be integrated in the process control and/or regulating system 4, 31, 32 so that when one or more welding devices 1, 27, 28 are activated and connected via the interface cable 50 to the interface 44, 45, 46, a representative signal is forwarded to the process control and/or regulating system 4, 31, 32. The welding devices 1, 27, 28 can therefore be switched to a "multi-operation mode" on a fully automated basis by means of this detection system if necessary.

Instead of or in addition to this interface 44, 45, 46, it would naturally also be possible to use a special connecting interface 47, 48, 49, as mentioned above, to provide a hard-wired or wireless link to a welding device 1, 27, 28 equipped accordingly, so that other power features and advantages can be obtained by means of this connecting interface 47, 48, 49, illustrated in FIG. 3.

It is also proposed by the invention that an interrupter element 51, 52, 53 be provided between the process control and/or regulating system 4, 31, 32 and the interface 33, 34, 35, as schematically indicated by a switch element. The purpose of the interrupter element 51, 52, 53 is to either disable or galvanically separate the process control and/or regulating system 4, 31, 32 from the process controller, in particular from the components of the power component 3, 29, 30, i.e. when the interface 44, 45, 46 is activated, the interrupter element 51, 52, 53 disables data communication between the process control and/or regulating system 4, 31, 32 and the interface 33, 34, 35 and/or the power component 3, 29, 30. The schematic diagram of the interrupter elements 51, 52, 53 is intended to depict a switching element configured on the basis of hardware. By preference, however, the interrupter element 51, 52, 53 is provided in the form of a software solution and selectively prompts functional or active disconnections or connections between the process control and/or regulating system 4, 31, 32 and the associated interface 33, 34, 35 or power component 3, 29, 30. Specifically, when the interfaces 44, 45, 46 are activated, the interrupter element 51, 52, 53 disables data communication between the process control and/or regulating system 4, 31, 32 and the interface 33, 34, 35 or the power component 3, 29, 30.

Consequently, all of the process control and/or regulating systems 4 or 32 or 33 are disabled with the exception of a single process control and/or regulating system 4 or 32 or 33, so that they no longer have any effect on the process control systems, in particular on the corresponding power component 3, 29, 30.

By interconnecting the welding devices 1, 27, 28 via the interface cable 50, the process control and/or regulating system 4, 31, 32 firstly establishes what type of data transmission is to be run, i.e. it is initially detected that the welding devices 1, 27, 28 are interconnected, after which the other function sequences are processed. Also as part of this data exchange, a software process is automatically run via the process control and/or regulating systems 4, 31, 32 to ascertain which welding device 1, 27, 28 is to assume the control function, i.e. through the data exchange, the welding device 1 is selected as being the main welding device for example, in particular the master welding device 1, and the other welding devices 27, 28 will then be run as auxiliary welding devices, in particular slave welding devices. Once the priorities of the welding devices 1, 27, 28 have been established by the respective process control and/or regulating systems 4, 31, 32, the interrupter elements 51, 52, 53 are then operated, i.e. the connections between the process control and/or regulating systems 4, 31, 32 and the interface 33, 34, 35 or the power component 3, 29, 30 are interrupted. To this end, at least one switching element or interrupter element 51, 52, 53 will be switched in such a way that it establishes an active coupling or galvanic connection between the power component 3, 29, 30 and the interface 33, 34, 35. In the case of the master welding device 1, which is activated by the process control and/or regulating system 4 in readiness for process control or process regulation, the switching element or interrupter element 51 is switched between the power component 3 and the process control and/or regulating system 4.

Deactivating the process control and/or regulating systems 31, 32 of the auxiliary welding devices 27, 28 means that one process control and/or regulating system 4 will now be responsible for several power components 3, 29, 30 and, from a physical point of view, one welding device 1 or 27 or 28 will be configured with several power components 3 and 29 and 30. The process control and the process regulation for the other connected welding devices 1, 27, 28 will now be run by the master welding device 1, in other words by the process control and/or regulating system 4, and the data transfer between the individual welding devices 1, 27, 28 will be run across the interface 33, 34, 35 and the standardised interface 44, 45, 46.

Instead of automatically selecting the main welding device 1, 27, 28 as described above, it would also be possible for a user to select the data transmission type and respective main welding device 1, 27, 28 purposely from the input and/or output device 22, 36, 37.

It would also be possible for the other process control and/or regulating systems 31, 32 of the auxiliary welding devices 27, 28 to assist the process control and/or regulating system 4 of the master welding device 1 in computing and evaluating various welding parameters, i.e. the computing power could be divided between individual available process control and/or regulating systems 4, 31, 32, although in this case only the process control and/or regulating system 4 of the master welding device 1 will transmit a control and/or regulating signal or corresponding desired values to the power components 3, 29, 30. The desired values and control and/or regulating signals are sent across the interface 44 so that the other components of the other welding devices 27, 28, in particular the other power components 29, 30, will have them available for a process control.

As a result of the solution described above, it will now be possible the individual output jacks 38 to 43 of the power components 3, 29, 30 to be interconnected without the need for any control-side and secondary-side dismantling inside the welding devices 1, 27, 28, i.e. a parallel connection or a serial connection of welding devices 1, 27, 28, in particular power components 3, 29, 30, can be set up. In the embodiment illustrated as an example in FIG. 2, the power components 3, 29, 30 are connected in parallel whilst in FIG. 3, the power components 3, 29, 30 are connected in series. It would also be possible to connect a separate welding torch 10—FIG. 1—to each respective power component 3, 29, 30.

In the embodiment illustrated as an example in FIG. 2, the individual power components 3, 29, 30 are connected in parallel and to this end, the individual output jacks 38 to 43 are connected in parallel, i.e. the output jacks 38, 40, 42 are connected to one another via a line 54 for the positive potential and the other output jacks 39, 41, 43 for the negative potential are connected to one another via another line 55. By linking the power components 3, 29, 30 in this way, which is the approach a user would take whenever necessary, the power components 3, 29, 30 are linked in a parallel power circuit. It is therefore possible to split the power or increase the power to supply the consumer or the welding torch 10—FIG. 1—which is connected via the welding lines 17, 18 to power component 3, for example. The advantage of being able to divide or increase the requisite power is that welding devices 1, 27, 28 of a power rating below the required power can now be used. If several smaller devices are connected in parallel, the requisite power, in particular a welding current, can be obtained that is correspondingly higher than that which could be obtained from each individual welding device 1, 27, 28. As a result, less expensive welding devices 1, 27, 28 can also be used for welding processes requiring a higher power output, in particular a higher power consumption. This approach can be used by smaller companies, which only seldom need to run welding process with a high power requirement, because these can now be run using several welding devices 1, 27, 28 with a lower power specification. Depending on the power capacity which can be achieved by interconnection, it may still be necessary to fit the main welding device 1 with a welding torch 10—FIG. 1—that is designed for the specific power rating or simply adapt the diameter of the welding wire and/or the diameter of the contact to the achievable power.

In order to simplify interconnection of the welding devices 1, 27, 28, hose packs 23 and welding torch 10—illustrated in FIG. 1—are equipped for a multiple connection to individual power components 3, 29, 30. Consequently, the necessary re-fitting work can be taken care of particularly quickly, merely by changing these hose packs 23 or welding torches 10, which are equipped with appropriate couplings and rapid changeover systems, so that a plurality of welding devices 1, 27 28 can be interconnected depending on the design of the hose pack 23.

When the individual welding devices 1, 27, 28 are interconnected on the control-side, a digital connection with a high data transmission rate is established across the interfaces 44, 45, 46, so that the individual welding parameters, for example the desired value for the current, have to be transmitted by one process control and/or regulating system 4, 31, 32 only and to one process control and/or regulating system 4, 31, 32 only, in particular set from an input and/or output device 22, 36, 37. This data will then be transmitted across the aforementioned connection to the other welding devices 1, 27, 28. Since, however, every welding device 1, 27, 28 also has the other components and units or the monitoring functions needed for the process control and running the process, such as detecting actual values, temperature monitoring etc., the process control, in particular the welding process control system, is run directly from these components in the individual welding devices 1, 27, 28, in other words independently of one another. Each welding device 1, 27, 28 therefore controls and regulates the required power at the output jacks 38 to 43 independently, which makes the control process for the consumer or welding torch 10—FIG. 1—very much quicker and simultaneously reduces the amount of data to be mutually exchanged. This also means that no additional wiring or re-fitting is needed in order to interconnect the individual welding devices 1, 27, 28, such as needed using methods known from the prior art.

As a result of the fully equipped and individually fully functioning welding devices 1, 27, 28, the safety functions are also monitored and operated in every individual welding device 1, 27, 28, such as over-temperature, input voltage, over-current, short circuit detection etc. However, if an error occurs on one of the welding devices 1, 27, 28, a signal is sent accordingly across the interface 44, 45, 46 so that the master welding device 1 can detect that an error function exists in one of the other welding devices 27, 28. The master welding device 1 is then able to interrupt the welding process and transmit a corresponding optical and/or acoustic error signal or warning signal, in order to alert the user to this fact.

By connecting or interconnecting the individual welding devices 1, 27, 28, the master welding device is also able to establish through a data exchange with the other welding devices 1, 27, 28 which power components 3, 29, 30 are disposed in the other welding devices 1, 27, 28, so that the requisite power can be divided between the individual power components 3, 29, 30, i.e. the active process control and/or regulating system 4 can detect the power output parameters of the connected power components 3, 29, 30 via the interface 44, 45, 46 or via the connecting interface 47, 48, 49 and split or divide the load needed for the process control. This being the case, the active process control and/or regulating system 4 may detect not the number of interconnected welding devices 1, 27, 28 and power components 3, 29, 30, but the sum of the achievable energy, in particular the output voltage and/or the output current, so that the master welding device 1 can send out a corresponding output signal or a corresponding desired value.

One advantage gained from the possibility of linking several welding devices 1, 27, 28 at least on the control-side, in other words without interconnecting the power components 3, 29, 30, is that the welding parameters, such as the level of the welding current, the feed rate of the welding wire and such like, for example, only have to be set at one of the input and/output devices 22, 36, 37 of any welding device 1, 27, 28 by one user and all the welding devices 1, 27, 28 will be able to process the new desired values accordingly as a result of the control-side link-up. This possibility of linking several welding devices 1, 27, 28 on the control-side is of particular advantage from the point of view of training and for demonstration purposes. However, it is also useful if several welding engineers are required to run the same welding jobs jointly on one workpiece or object under the same conditions, because the welding parameters will only have to be set by one welding engineer. These settings will preferably be entered by the welding engineer who has the relevant knowledge and experience. This means the welding engineers being trained or the second welding engineer will not have to go through any difficult setting procedures.

In one particularly advantageous embodiment, the system of linking the welding devices 1, 27, 28 proposed by the invention can also be used for so-called multi-wire welding systems. For this purpose, at least two basically independent welding devices 1, 27, 28 are linked for control purposes via the interface 44, 45, 46 and the welding wires 13 of each welding device 1, 27, 28 are fed to a common welding torch 10—FIG. 1. Each of the wire electrodes fed to the common welding torch 10 is then supplied with the requisite electrical power from the respective power component 3, 29, 30. The single active process control and/or regulating system 4 will then control the functionally linked power components 3, 29, 30 and their wire feed devices so that the individual welding wires 13 flash at the same time or in a timed sequence, but that the power components 3, 29, 30 are nevertheless controlled separately during the process.

In FIG. 3, several welding devices 1, 27, 28 are connected to one electrical unit.

The embodiment illustrated as an example in FIG. 3 is a serial connection of several power components 3, 29, 30, which are linked to one another via a special connecting interface 47, 48, 49.

In the illustrated embodiment—FIG. 3—the three welding devices 1, 27, 28, shown as blocks in the diagram, are in turn electrically linked to one another directly by means of the interface cable 50, i.e. the additional connecting interfaces 47, 48, 49 are linked to one another. Since these connecting interfaces 47, 48, 49 are preferably configured for running a bit-parallel data transmission, a very rapid two-way data exchange can be run. Instead of providing electrical connecting interfaces 47, 48, 49, it would naturally also be possible for the connecting interfaces 47, 48, 49 and the interfaces 44, 45, 46—as illustrated in FIG. 2—to be set up for an inductive link via electromagnetic mutual fields and/or for an optical link via corresponding light signals or by means of radio, in other words operated on the basis of an electromagnetic and/or electrical and/or optical and/or inductive link.

When connecting the welding devices 1, 27, 28 in series—as illustrated in FIG. 3—the power component 3 of the master welding device 1, for example, in particular its output jack 39 for the negative potential, is connected to the output jack 40 of the welding device 27 for the positive potential via the line 54. The output jack 41 for the negative potential of the welding device 27 is connected via line 55 to the output jack 42 for the positive potential of the welding device 28. The consumer, in particular the welding torch 10, is then connected via the supply lines 17, 18 not just to one power component 3, 29, 30 but via the welding lines 17, 18 to the output jack 38 for the positive potential of the power component 3 and the output jack 43 for the negative potential of the power component 30.

The advantage of connecting the individual power components 3, 29, 30 in series in this manner is that during welding process requiring a higher voltage, the individual voltages can be summed by the series circuit, thereby enabling a welding process to be run with a very high output voltage with the output current at a constant level. As described above with respect to FIG. 2, the process control is again run independently by the individual welding devices 1, 27, 28 and only one process control and/or regulating system remains active whilst the others are deactivated.

Three welding devices 1, 27, 28 are interconnected in this embodiment illustrated as an example but it would naturally be possible to link only two or more than three welding devices 1, 27, 28.

In order to minimise ripple of the output current and/or to improve electromagnetic compatibility, the individual power components 3, 29, 30 are synchronised with one another at the same clock frequency via the interface 44, 45, 46 and/or via the connecting interface 47, 48, 49, in which case the individual power components 3, 29, 30 are activated with a corresponding phase shift. For this purpose, any welding device 1, 27, 28 may assume control of the synchronisation, i.e. the synchronisation signals or clock signals need not necessarily be generated and transmitted by the master welding device 1 but can be so by an auxiliary welding device 27, 28. This relieves the load on the computer resources of the master welding device 1.

To supply the welding devices 1, 27, 28 with power, the interconnected welding devices 1, 27, 28 may be set up in a star circuit, triangular circuit or respectively connected in parallel to an alternating or three-phase voltage supply, in which case every welding device 1, 27, 28 is preferably set up as a single-phase alternating voltage device. Accordingly, a welding device 1, 27, 28 can be connected to each phase of a multi-phase alternating voltage supply.

If the welding devices 1, 27, 28 are linked via the connecting interface 47, 48, 49, it is recommended that the welding devices 1, 27, 28 are also connected to one another via the standardised interface 44, 45, 46, across which data can then be transmitted which is not needed for the process control and/or process regulation system, thereby splitting the interface load.

A major advantage of using a system of this type to interconnect several welding devices 1, 27, 28 is that a user can automatically or selectively designate a master welding device 1, which generates the individual control and/or regulating signals, whereas the process control is assumed and run separately in the individual welding devices 1, 27, 28 and at the same time independently of one another. Moreover, the master welding device 1 can be connected via another serial interface 44, 45, 46 or one known from the prior art to an external component, such as a SPC controller or a robot controller, enabling a two-way data exchange to be run between external components and the interconnected welding devices 1, 27, 28. Another significant advantage resides in the fact that the computing capacity needed for complex process controls can be shared by several process control and/or regulating systems 4, 31, 32, thereby speeding up the computing process.

Although the description given above relates for the most part to applying the proposed solutions to welding devices 1, 27, 28, the solution proposed by the invention may naturally also be used with charging devices for electrochemical voltage sources or other current sources, since there are also major advantages to be had from the option of a parallel and series connection of several current or voltage sources in applications of this type.

Naturally, however, it would also be possible to set up the electrical connection between the connecting interfaces 47, 48, 49 or the interfaces 44, 45, 48 automatically, in a simple array or form-fit connection. Electro-mechanical plug and socket connections are provided for this purpose, so that the desired electrical connections between the power components 3, 29, 30 can be automatically set up by means of a corresponding layout of the welding devices 1, 27, 28. However, it would also be possible to provide the power components 3, 29, 30 with so-called contact slides, which can make contact with the connecting interface 47, 48, 49 of an adjacently disposed power component 3, 29, 30 in the extracted state.

The advantage of this arrangement resides in the fact that it dispenses with the need for separate cable connections and several welding devices 1, 27, 28 can be grouped together in a compact integral unit. The housings 26 of the welding devices 1, 27, 28 can be provided with matching recesses and projections to enable the individual welding devices 1, 27, 28 to be connected to one another.

The major difference compared with the various solutions known from the prior art is that all the power components 3, 29, 30 can be used, particularly if the output jacks 38 to 43 of the individual welding devices 1, 27, 28 are connected in parallel, but only a single process control and/or regulating system 4 or 31 or 32 is in active operation. The other process control and/or regulating systems 4, 31, 32 are deactivated by the interrupter element 51, 52, 53 and the data link is detected by the detection system using software in the solution proposed by the invention, whereas the embodiments known from the prior art require manual intervention in the electronics and in the internal structure of the welding devices 1, 27, 28.

Finally, it should be pointed out that in order to provide a clearer understanding of the solution proposed by the invention, individual parts of the embodiments described as examples are illustrated to a certain extent on a disproportionately large scale. Individual parts of the combinations of features described in the individual examples of embodiments may also be used with other individual features from other examples of embodiments to devise independent inventive solutions.

Above all, the individual embodiments illustrated in FIGS. 1; 2, 3 may be construed as independent solutions of the invention in their own right. The relevant objectives and solutions proposed by the invention may be found in the detailed descriptions of these drawings.

| List of reference numbers | |
|---|---|
| 1 | Welding apparatus |
| 2 | Welding current source |
| 3 | Power component |
| 4 | Control system |
| 5 | Switching element |
| 6 | Control valve |
| 7 | Supply line |
| 8 | Gas |
| 9 | Gas storage |
| 10 | Welding torch |
| 11 | Wire feed device |
| 12 | Supply line |
| 13 | Welding wire |
| 14 | Supply reel |
| 15 | Arc |
| 16 | Workpiece |
| 17 | Welding line |
| 18 | Welding line |
| 19 | Coolant circuit |
| 20 | Flow indicator |
| 21 | Water container |
| 22 | Input and/or output device |
| 23 | Hose pack |
| 24 | Connecting device |
| 25 | Tension-relieving device |
| 26 | Housing |
| 27 | Welding device |
| 28 | Welding device |
| 29 | Power component |
| 30 | Power component |
| 31 | Process control and/or regulating system |
| 32 | Process control and/or regulating system |
| 33 | Interface |
| 34 | Interface |
| 35 | Interface |
| 36 | Input and/or output device |
| 37 | Input and/or output device |
| 38 | Output jack |
| 39 | Output jack |
| 40 | Output jack |
| 41 | Output jack |

-continued

| List of reference numbers | |
|---|---|
| 42 | Output jack |
| 43 | Output jack |
| 44 | Interface |
| 45 | Interface |
| 46 | Interface |
| 47 | Connecting interface |
| 48 | Connecting interface |
| 49 | Connecting interface |
| 50 | Interface cable |
| 51 | Interrupter element |
| 52 | Interrupter element |
| 53 | Interrupter element |
| 54 | Line |
| 55 | Line |

What is claimed is:

1. Method of linking and interconnecting several welding devices, in particular several welding current sources, plasma current sources or similar, in which, with every welding device operating individually, a process control system transmits desired values to a voltage-to-current controller of a power component and the power component supplies a consumer connected to output jacks with power (current/voltage) on the basis of the desired values, and the process control system is equipped for a data exchange across an interface with another component, such as another welding device, a robot controller, a PC or laptop, wherein several welding devices of the same or a different power rating or having the same or different output parameters, in particular machine specifications, are linked to one another on the secondary-side via the output jacks to form a welding device with a physically higher power output, the interconnected welding devices being digitally interconnected via a digital interface or a special digital connecting interface for a data exchange for control purposes, a process control system of one welding device assuming process control and all other process control systems of the welding devices being deactivated by an interrupter element and the welding devices with the deactivated process control systems receiving the desired values across the interface or the connecting interface from the process-controlling welding device, the interrupter element being operated on the basis of software in the process control system.

2. Method as claimed in claim 1, wherein, in order to minimise output current ripple or improve electromagnetic compatibility, the individual power components are synchronised with one another at the same clock frequency via the interface or via the connecting interface the individual power components being activated with a corresponding phase shift.

3. Method as claimed in claim 1, wherein the active process control system does not detect the number of interconnected welding devices and power components but the sum of the achievable power, in particular the output voltage and/or the output current.

4. Method as claimed in claim 1, wherein the interconnected welding devices are set up in a star circuit, triangular circuit or connected in parallel to an alternating and three-phase voltage supply.

5. Method as claimed in claim 4, wherein every welding device is set up as a single-phase alternating voltage device.

6. Method as claimed in claim 1, wherein the welding devices are electromagnetically or electrically or optically or inductively linked on the control side.

7. Method as claimed in claim 1, wherein the output jacks of the power components are connected to one another in parallel or in series via lines or welding lines, depending on the required power output, at least two of the output jacks being connected to a positive and a negative potential, to the consumer, in particular the welding torch.

8. Method as claimed in claim 1, wherein the activated process control system can detect the power parameters of the power components linked via the interface or via the connecting interface and thus divide the load or divide the power for the process control.

9. Method as claimed in claim 1, wherein safety values or control functions needed for a welding process and a current supply process, such as over-temperature, input voltage, over-current, are monitored and operated by every welding device independently.

10. Method as claimed in claim 1, wherein the data transmission between the individual welding devices is run in two directions via the interface or via the connecting interface.

11. Method as claimed in claim 1, wherein, when the interfaces or the connecting interface are activated by the interrupter element, data communication between the process control system and an interface or the power component is disabled.

12. Welding device, in particular a welding current source or plasma current source, consisting of at least one process control system and one power component, in which a voltage-to-current controller is integrated, comprising at least one digital connecting interface or a digital interface, via which this welding device can be linked for control purposes to at least one other welding device of a like configuration, an output jack of the power component of this welding device being connectable, on the secondary side, to output jacks of at least one other power component of another welding device with the same or a different power rating and having the same or different output parameters, in particular machine specifications, and a process control system of this welding device is activated in order to control the process of all the interconnected welding devices and all other process control systems of the other welding devices are deactivated, the welding device having an interrupter element, by means of which the process control system can be deactivated, the interrupter element being set up by means of software in the process control system.

13. Welding device and current source as claimed in claim 12, wherein the output jacks of the interconnected power components are connected to one another in parallel or in series.

14. Welding device and current source as claimed in claim 12, wherein the interface or the connecting interface is linked to an interface of a welding device.

15. Welding device and current source as claimed in claim 12, wherein the welding device has a detection system for activating the interface or the connecting interface.

16. Welding device and current source as claimed in claim 15, wherein the detection system is provided in the form of an electromechanical switching mechanism or by a transponder system or by means of software in the process control system.

* * * * *